US012159528B2

(12) United States Patent
Janko et al.

(10) Patent No.: US 12,159,528 B2
(45) Date of Patent: Dec. 3, 2024

(54) DETECTION AND PREVENTION OF NON-LINEAR EXCURSION IN A HAPTIC ACTUATOR

(71) Applicant: Cirrus Logic International Semiconductor Ltd., Edinburgh (GB)

(72) Inventors: Marco A. Janko, Austin, TX (US); Filippo Rossi, London (GB); Hamid Sepehr, London (GB); Kyle Wilkinson, South Lake Tahoe, CA (US); Emmanuel A. Marchais, Dripping Springs, TX (US); Vadim Konradi, Austin, TX (US); Anil Lal, Hounslow (GB); Aleksey S. Khenkin, Lago Vista, TX (US); Chin Huang Yong, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 69 days.

(21) Appl. No.: 18/080,900

(22) Filed: Dec. 14, 2022

(65) Prior Publication Data

US 2023/0237886 A1 Jul. 27, 2023

Related U.S. Application Data

(60) Provisional application No. 63/302,890, filed on Jan. 25, 2022.

(51) Int. Cl.
*G08B 6/00* (2006.01)

(52) U.S. Cl.
CPC .................................... *G08B 6/00* (2013.01)

(58) Field of Classification Search
CPC ...................................................... G08B 6/00
USPC ...................................................... 340/407.1
See application file for complete search history.

(56) References Cited

U.S. PATENT DOCUMENTS

| | | | | |
|---|---|---|---|---|
| 4,733,361 A * | 3/1988 | Krieser | G01M 13/02 702/34 |
| 6,865,274 B1 * | 3/2005 | Aarts | H04R 3/007 381/98 |
| 11,509,292 B2 | 11/2022 | Marchais | |

(Continued)

FOREIGN PATENT DOCUMENTS

| | | |
|---|---|---|
| EP | 2899883 B1 | 7/2016 |
| GB | 2526881 A | 12/2015 |
| GB | 2586528 A | 2/2021 |

OTHER PUBLICATIONS

International Search Report and Written Opinion of the International Searching Authority, International Application No. PCT/US2023/010782, mailed Jul. 11, 2023.

(Continued)

*Primary Examiner* — Jack K Wang
(74) *Attorney, Agent, or Firm* — Jackson Walker L.L.P.

(57) ABSTRACT

A method for determining and mitigating over-excursion of an internal mass of an electromechanical transducer may include measuring a sensed signal associated with the electromechanical transducer in response to a driving signal driven to the electromechanical transducer, determining a non-linearity value based on the sensed signal, mapping the non-linearity value to a probability of over-excursion of the internal mass, and applying a gain to a signal path configured to generate the driving signal based on the probability.

20 Claims, 4 Drawing Sheets

(56) References Cited

U.S. PATENT DOCUMENTS

| | | | | |
|---|---|---|---|---|
| 2006/0171318 | A1* | 8/2006 | Bergamasco | H04L 47/24 370/235 |
| 2009/0257599 | A1* | 10/2009 | Sand Jensen | H04R 9/022 381/55 |
| 2010/0290643 | A1* | 11/2010 | Mihelich | H04S 7/301 381/103 |
| 2012/0121098 | A1 | 5/2012 | Gautama | |
| 2012/0203166 | A1* | 8/2012 | Riback | A61M 5/1723 702/19 |
| 2013/0077795 | A1 | 3/2013 | Risbo et al. | |
| 2015/0139429 | A1* | 5/2015 | Gautama | H04R 3/007 381/55 |
| 2015/0304772 | A1* | 10/2015 | Risberg | H04R 3/007 381/55 |
| 2018/0136899 | A1* | 5/2018 | Risberg | G06F 3/165 |
| 2018/0160228 | A1* | 6/2018 | Hu | H04R 29/001 |
| 2020/0313654 | A1 | 10/2020 | Marchais et al. | |

OTHER PUBLICATIONS

Klippel, W., Assessment of Voice-Coil Peak Displacement XMAX, Journal of the Audio Engineering Society, Audio Engineering Society, New York, NY, US, vol. 51, No. 5, May 1, 2003, pp. 307-323.

Gander, M.R., Moving-Coil Loudspeaker Topology as an Indicator of Linear Excursion Capability, Journal of the Audio Engineering Society, Audio Engineering Society, New York, NY, US, vol. 29, No. 1/02, Jan. 1, 1981, pp. 10-26.

Klippel, W., Tutorial: Loudspeaker Nonlinearities-Causes, Parameters, Symptoms, Journal of the Audio Engineering Society, Audio Engineering Society, New York, NY, US, Oct. 1, 2006, pp. 1-69.

* cited by examiner

DETECTION AND PREVENTION OF NON-LINEAR EXCURSION IN A HAPTIC ACTUATOR

CROSS-REFERENCES AND RELATED APPLICATION

The present disclosure claims benefit of U.S. Provisional Patent Application Ser. No. 63/302,890, filed Jan. 25, 2022, which is incorporated by reference herein in its entirety.

FIELD OF DISCLOSURE

The present disclosure relates in general to methods, apparatuses, or implementations for haptic devices. In particular, embodiments set forth herein may disclose systems and methods for detection and prevention of non-linear excursion in a haptic actuator.

BACKGROUND

Vibro-haptic transducers, for example linear resonant actuators (LRAs), are widely used in portable devices such as mobile phones to generate vibrational feedback to a user. Vibro-haptic feedback in various forms creates different feelings of touch to a user's skin and may play increasing roles in human-machine interactions for modern devices.

An LRA may be modelled as a mass-spring electro-mechanical vibration system. When driven with appropriately designed or controlled driving signals, an LRA may generate certain desired forms of vibrations. For example, a sharp and clear-cut vibration pattern on a user's finger may be used to create a sensation that mimics a mechanical button click. This clear-cut vibration may then be used as a virtual switch to replace mechanical buttons.

FIG. 1 illustrates an example of a vibro-haptic system in a device 100. Device 100 may comprise a controller 101 configured to control a signal applied to an amplifier 102. Amplifier 102 may then drive a vibrational actuator (e.g., haptic transducer) 103 based on the signal. Controller 101 may be triggered by a trigger to output to the signal. The trigger may, for example, comprise a pressure or force sensor on a screen or virtual button of device 100.

Among the various forms of vibro-haptic feedback, tonal vibrations of sustained duration may play an important role to notify the user of the device of certain predefined events, such as incoming calls or messages, emergency alerts, and timer warnings, etc. In order to generate tonal vibration notifications efficiently, it may be desirable to operate the haptic actuator at or near its resonance frequency.

The resonance frequency $f_0$ of a haptic transducer may be approximately estimated as:

$$f_0 = \frac{1}{2\pi\sqrt{CM}} \quad (1)$$

where C is the compliance of the spring system, and M is the equivalent moving mass, which may be determined based on both the actual moving part in the haptic transducer and the mass of the portable device holding the haptic transducer.

Due to sample-to-sample variations in individual haptic transducers, mobile device assembly variations, temporal component changes caused by aging, and use conditions such as various different strengths of a user gripping of the device, the vibration resonance of the haptic transducer may vary from time to time.

FIG. 2 illustrates an example of a linear resonant actuator (LRA) modelled as a linear system. LRAs are non-linear components that may behave differently depending on, for example, the voltage levels applied, the operating temperature, and the frequency content of a driving signal. However, these components may be modelled as linear components within certain conditions. In this example, the LRA is modelled as a third order system having electrical and mechanical elements. In particular, Re and Le are the DC resistance and coil inductance of the coil-magnet system, respectively; and Bl is the magnetic force factor of the coil. The driving amplifier outputs the voltage waveform V(t) with the output impedance Ro. The terminal voltage $V_T(t)$ may be sensed across the terminals of the haptic transducer. The mass-spring system 201 moves with velocity u(t).

A haptic system may require precise control of movements of the haptic transducer. Such control may rely on the magnetic force factor Bl, which may also be known as the electromagnetic transfer function of the haptic transducer. In an ideal case, magnetic force factor Bl can be given by the product B·l, where B is magnetic flux density and l is a total length of electrical conductor within a magnetic field that produces flux density B. Both magnetic flux density B and length l should remain constant in an ideal case with motion occurring along a single axis.

As described above, when a current is passed through the coil of the electromagnet, the electromagnet may experience a force due to the interaction of the electromagnet and a permanent magnet. A vibrational actuator 103 may be mechanically mounted to the structure of device 100 in such a way that the vibrations due to the moving mass are transferred to the device so it can be felt by a user. In most portable electronic devices, vibrational actuator 103 is driven from a low output impedance amplifier 102 with a voltage waveform. However, a user may experience a haptic event due to the acceleration of a mass in vibrational actuator 103, working against the mass of the rest of device 100, as well as the user's hand.

For a given steady-state input voltage signal, the response of an LRA may become increasingly non-linear as the amplitude of the voltage increases beyond a certain limit—usually specified as the maximum voltage level by the LRA manufacturer. This non-linearity typically results from amplitude-dependent changes to the spring constant associated with the springs that suspend the inner mass of the LRA. Such amplitude dependency is typically most prominent at higher voltage levels. Depending on the construction of the LRA, large enough input signals driven at or near the resonance frequency may displace the inner-mass of the LRA to such an extent that it contacts an enclosure of the LRA or its mechanical end-stops. Such behavior is typically referred to as over-excursion. Such occurrence can negatively impact user experience and, in some cases, physically damage the LRA. Accordingly, systems and methods for detection of and protection from such over-excursion may be desired.

SUMMARY

In accordance with the teachings of the present disclosure, the disadvantages and problems associated with existing approaches for generating a haptic waveform for an electromagnetic transducer may be reduced or eliminated.

In accordance with embodiments of the present disclosure, a method for determining and mitigating over-excursion of an internal mass of an electromechanical transducer may include measuring a sensed signal associated with the electromechanical transducer in response to a driving signal driven to the electromechanical transducer, determining a non-linearity value based on the sensed signal, mapping the non-linearity value to a probability of over-excursion of the internal mass, and applying a gain to a signal path configured to generate the driving signal based on the probability.

In accordance with these and other embodiments of the present disclosure, a system for determining and mitigating over-excursion of an internal mass of an electromechanical transducer may include an input configured to measure a sensed signal associated with the electromechanical transducer in response to a driving signal driven to the electromechanical transducer and a non-linear excursion detector configured to determine a non-linearity value based on the sensed signal, map the non-linearity value to a probability of over-excursion of the internal mass, and apply a gain to a signal path configured to generate the driving signal based on the probability.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiment discussed below, and all such equivalents should be deemed as being encompassed by the present disclosure.

Various electronic devices or smart devices may have transducers, speakers, and acoustic output transducers, for example any transducer for converting a suitable electrical driving signal into an acoustic output such as a sonic pressure wave or mechanical vibration. For example, many electronic devices may include one or more speakers or loudspeakers for sound generation, for example, for playback of audio content, voice communications and/or for providing audible notifications.

Such speakers or loudspeakers may comprise an electromagnetic actuator, for example a voice coil motor, which is mechanically coupled to a flexible diaphragm, for example a conventional loudspeaker cone, or which is mechanically coupled to a surface of a device, for example the glass screen of a mobile device. Some electronic devices may also include acoustic output transducers capable of generating ultrasonic waves, for example for use in proximity detection-type applications and/or machine-to-machine communication.

Many electronic devices may additionally or alternatively include more specialized acoustic output transducers, for example, haptic transducers, tailored for generating vibrations for haptic control feedback or notifications to a user. Additionally or alternatively, an electronic device may have a connector, e.g., a socket, for making a removable mating connection with a corresponding connector of an accessory apparatus, and may be arranged to provide a driving signal to the connector so as to drive a transducer, of one or more of the types mentioned above, of the accessory apparatus when connected. Such an electronic device will thus comprise driving circuitry for driving the transducer of the host device or connected accessory with a suitable driving signal. For acoustic or haptic transducers, the driving signal may generally be an analog time varying voltage signal, for example, a time varying waveform.

Figure 3:
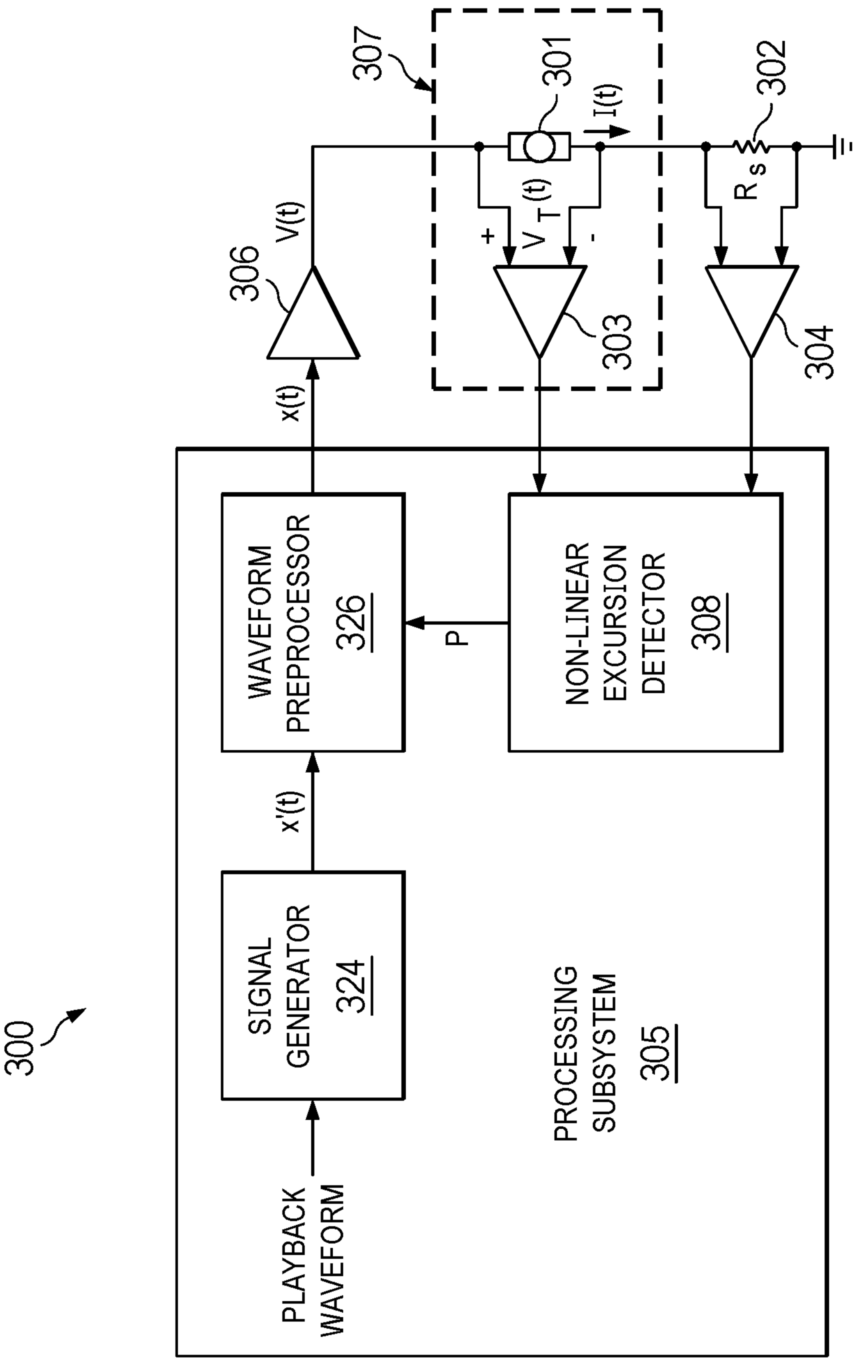
FIG. 3 illustrates selected components of an example host device, in accordance with embodiments of the present disclosure.

FIG. 3 illustrates selected components of an example host device 300 incorporating force sensing using an electromagnetic load 301 of host device 300, in accordance with embodiments of the present disclosure. Host device 300 may include, without limitation, a mobile device, home application, vehicle, and/or any other system, device, or apparatus that includes a human-machine interface. Electromagnetic load 301 may include any suitable load with a complex impedance, including without limitation a haptic transducer, a loudspeaker, a microspeaker, a piezoelectric transducer, or other suitable transducer.

Figure 4:
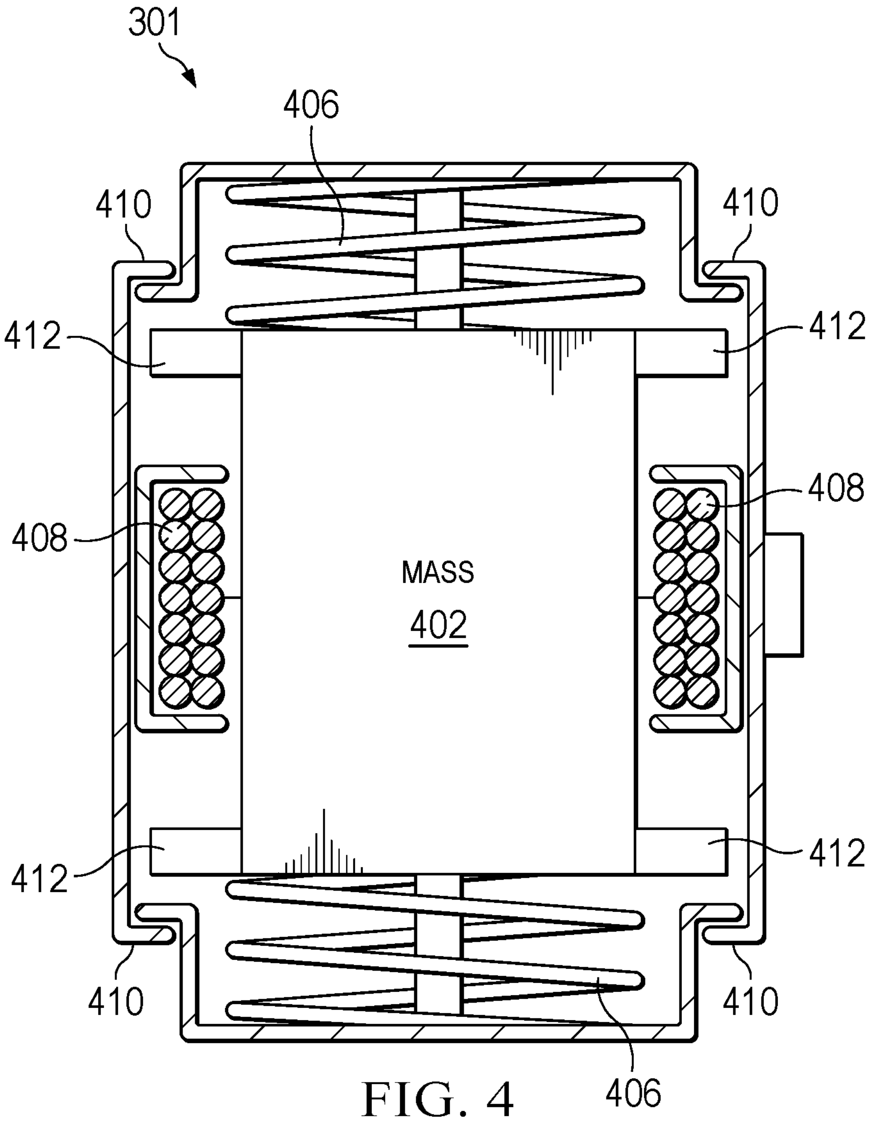
FIG. 4 illustrates a cross-sectional view of an example electromagnetic load implemented as a haptic transducer, in accordance with embodiments of the present disclosure.

Turning briefly to FIG. 4, FIG. 4 illustrates a cross-sectional view of example electromagnetic load 301 implemented as a haptic transducer, in accordance with embodiments of the present disclosure. As shown in FIG. 4, electromagnetic load 301 may include a moving mass 402 mechanically coupled to a housing 404 via one or more springs 406. Moving mass 402 may comprise a ferromagnetic material such that an alternating current flowing in a coil 408 surrounding moving mass 402 may induce an alternating mechanical field that causes moving mass 402 to vibrate (e.g., up and down in the orientation shown in FIG. 4). Housing 404 may include end stops 410 configured to engage with corresponding features 412 of moving mass 402 in order to limit excursion of moving mass 402 within housing 404. As described above, mechanical contact between features 412 and end stops 410 may cause non-linearities between the electromagnetic signal driving electromagnetic load 301 and the displacement or excursion of moving mass 402 relative to housing 404.

Turning again to FIG. 3, in operation, a signal generator 324 of a processing subsystem 305 of host device 300 may generate a raw transducer driving signal x'(t) (which, in some embodiments, may be a waveform signal, such as a haptic waveform signal or audio signal). Raw transducer driving signal x'(t) may be generated based on a desired playback waveform received by signal generator 324.

Raw transducer driving signal x'(t) may be received by waveform preprocessor 326 which, as described in greater detail below, may optimize raw transducer driving signal x'(t) based on a probability of over-excursion of the moving mass of electromagnetic load 301 to generate processed transducer driving signal x(t), as described in greater detail below.

Processed transducer driving signal x(t) may in turn be amplified by amplifier 306 to generate a driving signal V(t) for driving electromagnetic load 301. Responsive to driving signal V(t), a sensed terminal voltage $V_T(t)$ of electromagnetic load 301 may be sensed by a terminal voltage sensing block 307, for example a volt-meter, and converted to a digital representation by a first analog-to-digital converter (ADC) 303. Similarly, sensed current I(t) may be converted to a digital representation by a second ADC 304. Current I(t) may be sensed across a shunt resistor 302 having resistance $R_s$ coupled to a terminal of electromagnetic load 301.

As shown in FIG. 3, processing subsystem 305 may include a non-linear excursion detector 308, configured to, based on sensed terminal voltage $V_T(t)$ and sensed current I(t), determine a presence of non-linearities between the electromagnetic signal driving electromagnetic load 301 and a displacement of a moving mass (e.g., moving mass 402) of electromagnetic load 301 and based on such non-linearities, determine a probability P of over-excursion of the moving mass.

Figure 1:
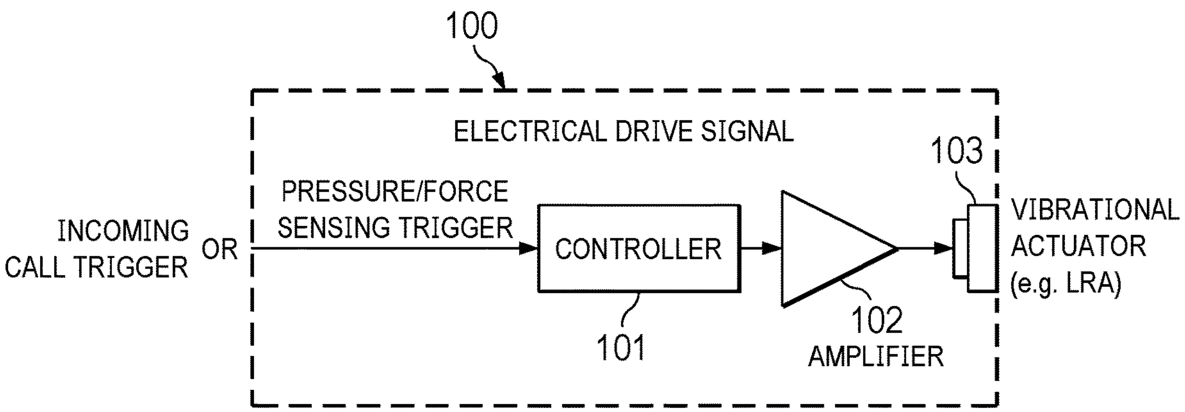
FIG. 1 (PRIOR ART)
FIG. 1 illustrates an example of a vibro-haptic system in a device, as is known in the art.
Figure 2:
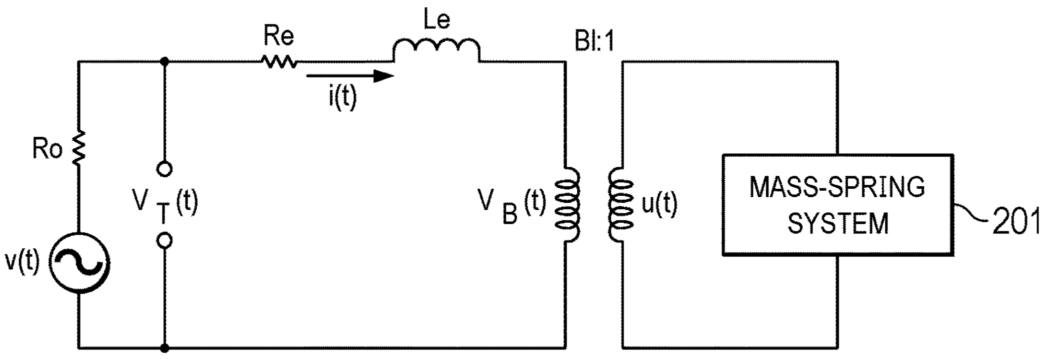
FIG. 2 (PRIOR ART)
FIG. 2 illustrates an example of a Linear Resonant Actuator (LRA) modelled as a linear system, as is known in the art.

To illustrate such functionality of non-linear excursion detector 308, non-linear excursion detector 308 may estimate a back-EMF voltage $V_B(t)$ for electromagnetic load 301. In general, back EMF voltage $V_B(t)$ may not be directly measured from outside of the haptic transducer. However, the terminal voltage $V_T(t)$ measured at the terminals of the haptic transducer may be related to $V_B(t)$ by:

$$V_T(t) = V_B(t) + Re \cdot I(t) + Le \cdot \frac{dI(t)}{dt} \tag{2}$$

where the parameters are defined as described with reference to FIG. 2. Consequently, back-EMF voltage $V_B(t)$ may be estimated according to equation (2) which may be rearranged as:

$$V_B(t) = V_T(t) - Re \cdot I(t) - Le\frac{dI(t)}{dt} \tag{3}$$

Because back-EMF voltage $V_B(t)$ may be proportional to velocity of the moving mass of electromagnetic load 301, back-EMF voltage $V_B(t)$ may in turn provide an estimate of such velocity. Thus, back-EMF voltage $V_B(t)$ may be estimated based on an equivalent electrical model of electromagnetic load 301, and such electrical model may vary on parameters of electromagnetic load 301 and host device 300 including resonance frequency and quality factor.

The estimates of DC resistance Re and inductance Le may not need to be accurate (e.g., within an approximate 10% error may be acceptable), and thus, fixed values from an offline calibration or from a data sheet specification may be sufficient. As an example, in some embodiments, non-linear excursion detector 308 may determine estimated back-EMF voltage $V_B(t)$ in accordance with the teachings of U.S. patent application Ser. No. 16/559,238, filed Sep. 3, 2019, which is incorporated by reference herein in its entirety.

With measurements of both sensed current I(t) and back-EMF voltage $V_B(t)$, non-linear excursion detector 308 may estimate internal states of electromagnetic load 301. Distortion and other non-linearities may be extracted from sensed current I(t), back-EMF voltage $V_B(t)$, or a combination of both. Based on the amount of non-linearities observed relative to a threshold, non-linear excursion detector 308 may control processed transducer driving signal x(t) to prevent over-excursion.

Referring again to FIG. 4, if a spring 406 of electromagnetic load 301 is overstretched, moving mass 402 may exhibit non-linear behavior versus processed transducer driving signal x(t). Additionally, collisions between moving mass 402 and end stops 410 may also cause non-linear distortion. Thus, these two scenarios may define a non-linear behavior zone wherein electromagnetic load 301 is more likely to incur an over-excursion.

To determine a likelihood or probability of over-excursion, non-linear excursion detector 308 may use electrical measurements (e.g., terminal voltage $V_T(t)$, sensed current I(t), back-EMF voltage $V_B(t)$) to determine occurrence of non-linearity.

For example, when processed transducer driving signal x(t) is non-periodic, as may be the case for a haptic playback waveform during operation of host device 300, a probability P of over-excursion may be determined by comparing a voltage content ratio associated with terminal voltage $V_T(t)$ to a current voltage ratio associated with sensed current I(t). The voltage content ratio may comprise a ratio of high-frequency content present in terminal voltage $V_T(t)$ above a particular frequency to low-frequency content present in terminal voltage $V_T(t)$ below the particular frequency. Similarly, the current content ratio may comprise a ratio of high-frequency content present in sensed current I(t) above the particular frequency to low-frequency content present in sensed current I(t) below the particular frequency. A mathematical difference or ratio between the current content ratio and the voltage content ratio may represent the probability P of over-excursion.

In addition or alternatively to comparison of current content ratio to voltage content ratio, non-linear excursion detector 308 may determine probability P of over-excursion based on whether noise gating for a magnitude of sensed current I(t) is triggered while noise gating for a magnitude of terminal voltage $V_T(t)$ is untriggered. As another example, in an offline process in which a haptic waveform is not being generated, signal generator 324 may generate raw transducer driving signal x'(t), a pilot tone above the resonance frequency of electromagnetic load 301, and non-linear excursion detector 308 may measure a total harmonic distortion (THD) of the pilot tone caused by electromagnetic load 301 entering a non-linear behavior zone based on sensed current I(t) and terminal voltage $V_T(t)$. Such THD may be computed as a function of the pilot tone and its harmonics. Non-linear excursion detector 308 may further map the measured THD to a probability for over-excursion at particular frequencies and/or amplitudes, which may be used by waveform preprocessor 326 to generate processed transducer driving signal x(t).

Figure 5:
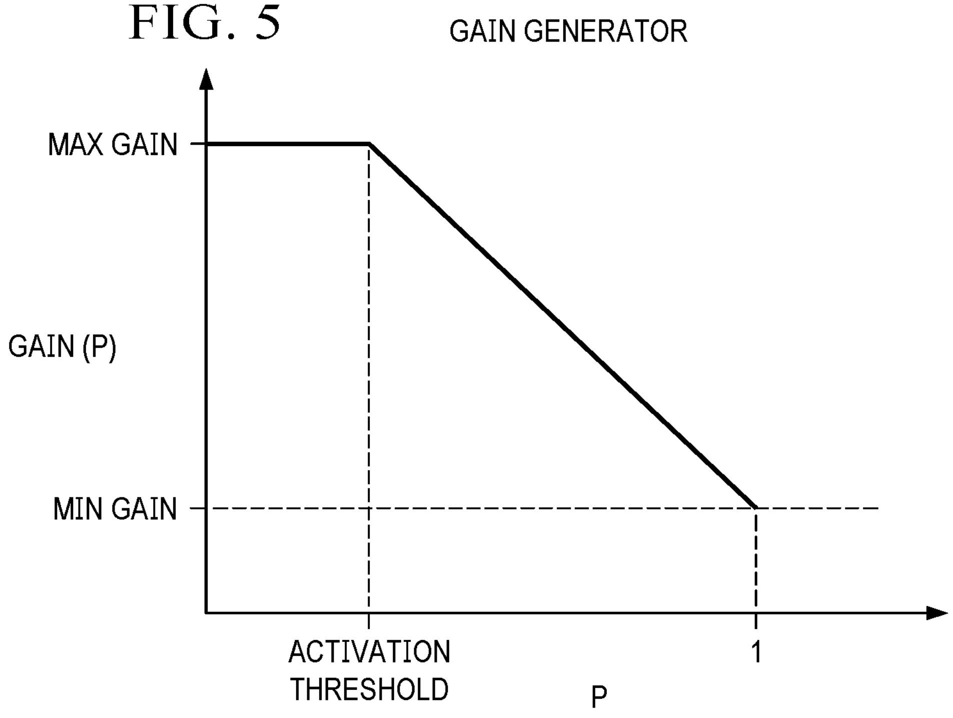
FIG. 5 illustrates a graph of an example gain that a waveform preprocessor may apply to a raw transducer driving signal as a function of a probability of over-excursion in order to generate a processed transducer driving signal, in accordance with embodiments of the present disclosure.

Waveform processor 326 may receive a signal indicative of probability P of over-excursion and based thereon, modify raw transducer driving signal x'(t) (e.g., by applying appropriate gains and/or filter responses) to generate processed transducer driving signal x(t) such that the likelihood of over-excursion of the moving mass of electromagnetic transducer 301 is decreased from the probability P determined by non-linear excursion detector 308, in order to eliminate or reduce an occurrence of moving mass 402 exceeding rated excursion limits and/or other limits of operation (e.g., limits defined by a manufacturer of electromagnetic load). For example, FIG. 5 illustrates a graph of an example gain that waveform preprocessor 326 may apply to raw transducer driving signal x' (t) as a function of a probability P of over-excursion in order to generate a processed transducer driving signal x(t), in accordance with embodiments of the present disclosure.

In accordance with the foregoing, systems and methods for determining and mitigating over-excursion of an internal mass (e.g., moving mass 402) of a haptic actuator and/or other electromagnetic load (e.g., electromagnetic load 301) may be provided, wherein a non-linearity value of the electromagnetic load may be measured based at least on a current signal (e.g., sensed current I(t)) associated with the electromagnetic load. The non-linearity value may be mapped into a likelihood value (e.g., probability P) of over-excursion of the moving mass. Further, the likelihood value may be used to determine a gain attenuation to be applied to a transducer driving signal.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method for determining and mitigating over-excursion of an internal mass of an electromechanical transducer, the method comprising:

measuring a sensed signal associated with the electromechanical transducer in response to a driving signal driven to the electromechanical transducer;

determining a non-linearity value based on the sensed signal;

mapping the non-linearity value to a probability of over-excursion of the internal mass; and applying a gain to a signal path configured to generate the driving signal based on the probability.

2. The method of claim 1, wherein determining the non-linearity value based on the sensed signal comprises determining a back-electromotive force associated with the electromechanical transducer based on the sensed signal.

3. The method of claim 1, wherein determining the non-linearity value comprises:

determining a first content ratio equal to a ratio of content present in the driving signal in a first frequency band to content present in the driving signal in a second frequency band;

determining a second content ratio equal to a ratio of content present in the sensed signal in the first frequency band to content present in the second frequency band; and determining the non-linearity value based on a comparison of the first content ratio and the second content ratio.

4. The method of claim 1, wherein determining the non-linearity value comprises:

determining a first content ratio equal to a ratio of high-frequency content present in the driving signal above a particular frequency to low-frequency content present in the driving signal below the particular frequency;

determining a second content ratio equal to a ratio of high-frequency content present in the sensed signal above the particular frequency to low-frequency content present in the sensed signal below the particular frequency; and determining the non-linearity value based on a comparison of the first content ratio and the second content ratio.

5. The method of claim 1, wherein determining the non-linearity value comprises determining the non-linearity value based on noise gating of a magnitude of the driving signal compared to noise gating of a magnitude of the sensed signal.

6. The method of claim 1, wherein determining the non-linearity value comprises:

generating the driving signal as a pilot tone at a frequency greater than a resonance frequency of electromechanical transducer;

measuring total harmonic distortion present in the sensed signal in response to the pilot tone; and determining the non-linearity value based on the total harmonic distortion.

7. The method of claim 1, further comprising attenuating the driving signal based on the gain.

8. The method of claim 1, wherein:

determining the non-linearity value based on the sensed signal comprises measuring harmonic components of the sensed signal; and the method further comprises determining an orientation of the electromagnetic transducer based on amplitude and phase of harmonic components of the sensed signal.

9. The method of claim 1, wherein:

the driving signal is a voltage signal; and the sensed signal is a current signal.

10. The method of claim 1, wherein the electromagnetic transducer is one of a haptic transducer, a voice coil, and a loudspeaker.

11. A system for determining and mitigating over-excursion of an internal mass of an electromechanical transducer, the system comprising:

an input configured to measure a sensed signal associated with the electromechanical transducer in response to a driving signal driven to the electromechanical transducer; and a non-linear excursion detector configured to:

determine a non-linearity value based on the sensed signal;

map the non-linearity value to a probability of over-excursion of the internal mass; and apply a gain to a signal path configured to generate the driving signal based on the probability.

12. The system of claim 11, wherein determining the non-linearity value based on the sensed signal comprises determining a back-electromotive force associated with the electromechanical transducer based on the sensed signal.

13. The system of claim 11, wherein determining the non-linearity value comprises:

determining a first content ratio equal to a ratio of content present in the driving signal in a first frequency band to content present in the driving signal in a second frequency band;

determining a second content ratio equal to a ratio of content present in the sensed signal in the first frequency band to content present in the second frequency band; and determining the non-linearity value based on a comparison of the first content ratio and the second content ratio.

14. The system of claim 11, wherein determining the non-linearity value comprises:

determining a first content ratio equal to a ratio of high-frequency content present in the driving signal above a particular frequency to low-frequency content present in the driving signal below the particular frequency;

determining a second content ratio equal to a ratio of high-frequency content present in the sensed signal above the particular frequency to low-frequency content present in the sensed signal below the particular frequency; and determining the non-linearity value based on a comparison of the first content ratio and the second content ratio.

15. The system of claim 11, wherein determining the non-linearity value comprises determining the non-linearity value based on noise gating of a magnitude of the driving signal compared to noise gating of a magnitude of the sensed signal.

16. The system of claim 11, wherein determining the non-linearity value comprises:

generating the driving signal as a pilot tone at a frequency greater than a resonance frequency of electromechanical transducer;

measuring total harmonic distortion present in the sensed signal in response to the pilot tone; and determining the non-linearity value based on the total harmonic distortion.

17. The system of claim 11, wherein the non-linear excursion detector is further configured to attenuate the driving signal based on the gain.

18. The system of claim 11, wherein:

determining the non-linearity value based on the sensed signal comprises measuring harmonic components of the sensed signal; and the method further comprises determining an orientation of the electromagnetic transducer based on amplitude and phase of harmonic components of the sensed signal.

19. The system of claim 11, wherein:

the driving signal is a voltage signal; and the sensed signal is a current signal.

20. The system of claim 11, wherein the electromagnetic transducer is one of a haptic transducer, a voice coil, and a loudspeaker.

* * * * *